United States Patent [19]

Panzani

[11] Patent Number: 4,879,031

[45] Date of Patent: Nov. 7, 1989

[54] BLOOD CENTRIFUGATION CELL

[75] Inventor: Ivo Panzani, Mirandola, Italy

[73] Assignee: Dideco S.p.A., Mirandola, Italy

[21] Appl. No.: 177,721

[22] Filed: Apr. 6, 1988

[30] Foreign Application Priority Data

Apr. 7, 1987 [IT] Italy ............................ 20036 A/87

[51] Int. Cl.⁴ ........................ B04B 15/00; B04B 7/08; B01D 33/00

[52] U.S. Cl. ................................ 210/360.2; 210/364; 210/369; 210/379; 210/382; 494/38; 494/76

[58] Field of Search .................. 210/360.1, 360.2, 364, 210/367, 369, 377, 378, 380.1, 382, 379; 127/19; 494/38, 41, 43, 76, 77

[56] References Cited

U.S. PATENT DOCUMENTS

| | | | |
|---|---|---|---|
| 3,145,713 | 8/1964 | Latham | 494/41 |
| 3,409,213 | 11/1963 | Latham | 494/41 |
| 3,565,330 | 2/1971 | Latham | 494/41 |
| 4,300,717 | 11/1981 | Latham | 494/41 |

*Primary Examiner*—W. Gary Jones

*Attorney, Agent, or Firm*—Peter C. Richardson; Larry C. Akers; Roger C. Turner

[57] ABSTRACT

A blood centrifugation cell has an outer container, a volume displacement inner body having a central passage, and an inlet conduit extending through the central passage to the bottom of the container. A seal is provided at the lower end of the body sealing the space between the inner conduit and the central passage. The seal permits red blood cells to be sucked from the container at any time during centrifugation without waiting for the cell to become completely filled.

5 Claims, 1 Drawing Sheet

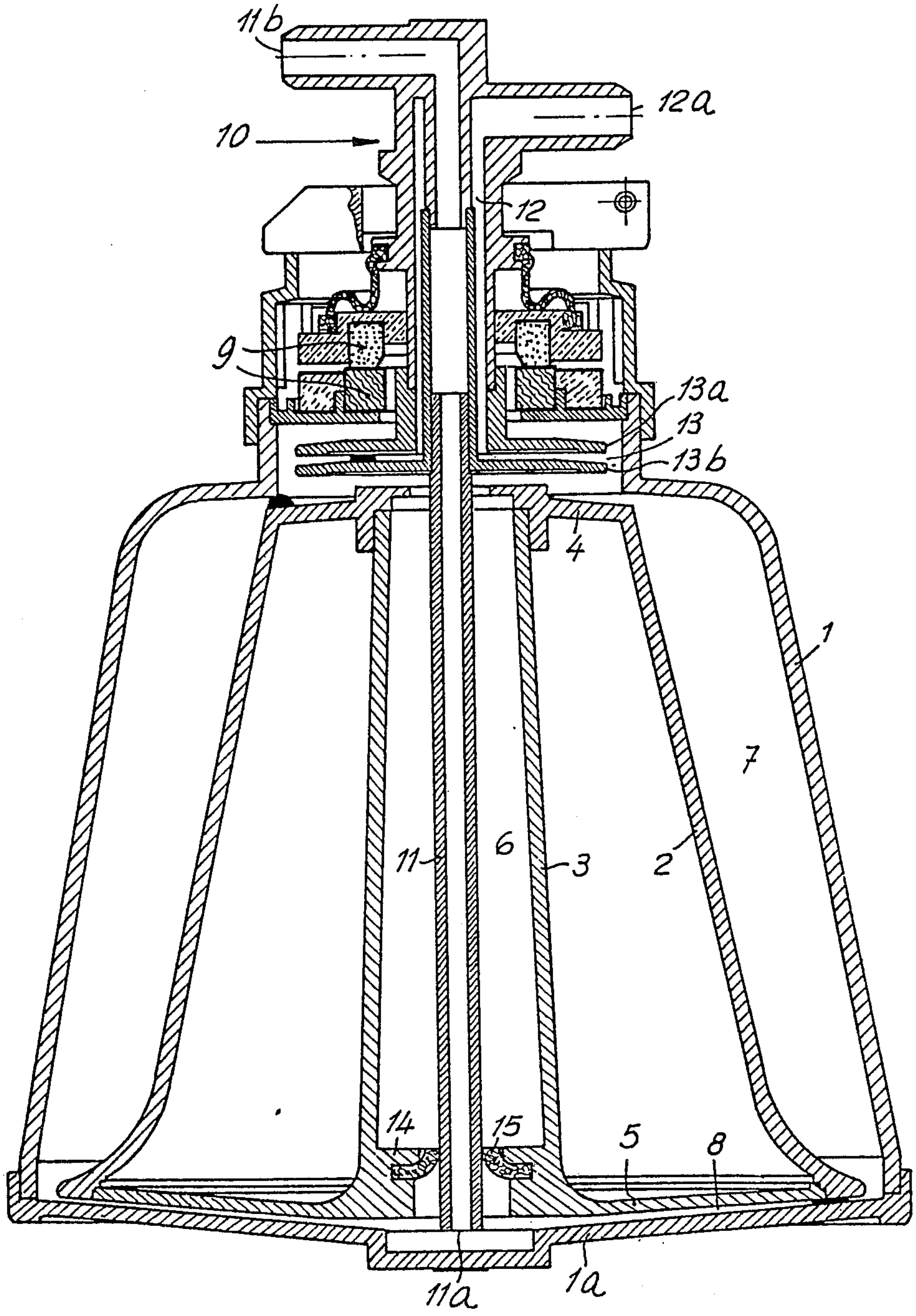
11b
12a
10
12
9
13a
13
13b
4
1
7
11
6
3
2
14
15
5
8
11a
1a

BLOOD CENTRIFUGATION CELL

BACKGROUND OF THE INVENTION

The invention relates to a blood centrifugation cell. It is well known that blood centrifugation to achieve separation of the red corpuscles from the other blood components, such as plasma, white corpuscles and platelets, is currently achieved in devices known as cells or bowls. These cells usually include a bell-shaped (truncated-cone shaped) outer container of a desired volume. A somewhat smaller but similarly shaped volume displacement body having a central passage is coaxially enclosed within the container to facilitate separation. The body can be described as a solid of revolution having a cylindrical inner wall and a truncated conical outer wall which are hermetically sealed at the upper and lower edges of the walls. The cell includes a stationary housing which is connected to and which encloses the upper end of the container. The connection includes an annular, rotatable bearing with suitable gaskets and seals. The housing has two generally coaxial conduits extending into the container and adapted for external connections to tubing for the inflow of blood and the outflow of blood components. The central inner conduit extends through the central passage in the body and extends down to the bottom of the container. The outer conduit at its lower end, is in communication with an annular passage formed between two facing discs positioned at the base of the stationary housing, that is, in the space portion at the top of the container. In these known cells, the outer container is gripped and rapidly rotated by a rotating mandrel. The whole blood is fed into the cell through the inner conduit and reaches the bottom of the outer container where it is subject to a centrifugal force; as a consequence thereof, the red corpuscles, which are heavier, collect and concentrate against the wall of the outer container, separated at a substantially vertical front from the lighter fractions, constituted by plasma, platelets, and white corpuscles, which remain inwards.

As the process continues, the inflow of whole blood causes the level of the components separated in the container to rise, and at a certain point, the light components begin to enter the passage between the two discs of the stationary housing, then travel along the outer conduit and are evacuated. The process continues until the concentrated red corpuscles in the container causes the separation front to approach the passage between the discs of the stationary housing. At this point, the process must be interrupted to prevent the outflow of red corpuscles from the cell. The supply of whole blood is then interrupted and the mandrel rotating the cell is stopped. The cell is free of the lighter fractions and is full of concentrated red corpuscles which can be sucked through the central conduit to empty the cell and to be sent on to the intended use.

A distinct disadvantage of these known cells is that the extraction of the concentrated red corpuscles is possible only when these red corpuscles have completely filled the cell; and therefore only after a substantial amount of blood has been centrifuged. This disadvantage is particularly relevant in case of intraoperative autotransfusion, that is, recovery of blood spilled by a patient during surgery. This blood is sucked and combined with a physiological solution for washing, and sent to a cell for separation of the red corpuscles. It is vitally important to rapidly reinfuse the red corpuscles to the patient. With known cells, this rapid reinfusion is clearly impossible, since it is necessary for the cell to be completely filled with red corpuscles in order to stop blood separation and extract these red corpuscles. Use of small-volume cells does not solve the problem, since it is impractical to have a range of dimensions such as to optimized performance in the variety of actual case. The above description and disadvantages apply to the separation of red corpuscles from whole blood and also for separation of red corpuscles from the physiological solution.

SUMMARY OF THE INVENTION

It is an object of the present invention to provide a cell for centrifugation of blood which allows extraction of concentrated red blood corpuscles without having to wait for the cell to become completely filled.

It is another object of the invention to provide a cell having a particularly simple structure, such as to insure a minimum cost and the maximum reliability in operation.

The objects are achieved by a blood centrifugation cell according to the present invention, which includes an outer container rotatable about a central axis which has an outer wall, an upper end and an enclosed bottom. The cell includes a volume displacement body which has an upper end, a lower end, and a generally cylindrical central longitudinal passage and is coaxially enclosed within the container with the lower end closely spaced from the bottom of the container. The cell includes a stationary housing which is connected to and which encloses the upper end of the container through an annular rotatable seal. The housing has a coaxial inner conduit and a coaxial outer conduit adapted for the inflow of blood and the outflow of blood components. A stationary passage is included within the housing near the upper end of the container and is in communication with the lower end of the outer conduit. The inner conduit extends downwardly through the central passage of the body and has the end thereof closely spaced from the bottom of the container. The body further includes a disc shaped elastomeric gasket having a central aperture adapted to receive the first conduit to seal the space between the inner conduit and the central passage at a location near the bottom of the body. The sealing of the space between the inner conduit and the body enables the red corpuscles to be drawn from the container through the inner conduit while the container is rotating without the necessity of the container being full of concentrated red corpuscles.

BRIEF DESCRIPTION OF THE DRAWING

Further features and advantages of the invention will become apparent from the detailed description of the invention described by way of a non-limitative example in the accompanying drawing wherein FIG. 1 is a front elevational view in section illustrating the structure of the invention.

DETAILED DESCRIPTION OF THE INVENTION

The invention is better understood with reference to the figure in which a bell-shaped (truncated-conically shaped) outer container 1 has an outer wall, an upper end and an enclosed bottom 1*a*. The outer container encloses a volume displacement body 2 having an upper end 4, a lower end 5 and a generally cylindrical central longitudinal passage 6. The body is somewhat smaller and has a shape substantially corresponding to the bell-shaped (truncated-conically shaped) configuration of the outer container 1 and is generally described as a solid of revolution having a cylindrical inner wall 3 and the bell-shaped outer wall 2 enclosed at the upper edges by the upper end 4 and at the lower edges by the lower end 5. The body is coaxially attached within the container with the lower end 5 closely spaced from the bottom 1*a* of the container defining an outer passage 7 between the outer surface of the body and the inner surface of the container, and a bottom passage 8 between the lower end of the body and the bottom of the container.

The cell includes a stationary housing, generally indicated as 10, which is connected through a set of annular rotatable seals and bearings, generally indicated as 9, to enclose the upper end of the outer container 1. The stationary housing 10 includes an inner conduit 11 and an outer conduit 12 which are coaxial to the axis of rotation of the cell. The inner conduit 11 extends downwardly through the central passage 6 of the body with the lower end 11*a* closely spaced from the bottom 1*a* of the container. The inner conduit 11 is provided at the upper end with a typical tubing connection portion 11*b* and which initially acts as the inlet for whole blood or blood in solution into the cell. The outer conduit 12 is provided with a tubing connection portion 12*a* and communicates at its lower end with a passage 13 formed between two facing discs 13*a* and 13*b* located at the base of the housing near the upper end of the container. Passage 13 and outer conduit 12 are utilized primarily to remove the lighter fractions constituted by plasma, platelets, and white corpuscles from the cell.

A principle feature of the invention is that the lower end of passage 6 has a reduced diameter portion forming an inward flange 14 and which retains a sealing gasket 15. The sealing gasket 15 seals the space between the lower end 11*a* of the inner conduit and the central passage 6 of the body. An exemplary sealing gasket is described as an elastomeric disc having an outer diameter adapted to be retained within the central passage and having a central aperture adapted to receive the conduit 11. A variety of shapes and materials could be utilized which provide a sealing engagement yet permit rotation of the seal relative to the stationary inner conduit 11.

In operation of the centrifugation cell, the outer container 1 is retained by a mandrel and rapidly rotated by a rotating mandrel centrifuge device. Whole blood (or blood in solution) is continuously fed at connector 11*b* through inner conduit 11 and is discharged from the end 11*a* at the bottom of the container and is subject to the action of the centrifugal force as a consequence of the rotation of the container. This function is common to all known centrifugation cells. In known centrifugation cells of the prior art, the lower end 11*a* of the inner conduit is in communication with the space within the passage 6 containing air and which is also in communication with the light fractions; and therefore, the red cells cannot be sucked through inner conduit 11 at this time during centrifugation. Interruption of the rotation of the cell gives rise to remixing of the separated parts and therefore the centrifugation cannot be stopped prior to completely filling the outer container in order to suck the concentrated red corpuscles through the conduit 11.

According to the present invention, resulting from the sealing gasket 15, at any time during centrifugation, the inflow of whole blood can be interrupted without stopping rotation of the cell and the concentration of red corpuscles can be withdrawn through the inner conduit at 11*a* through the stationary housing. Conduit 11 is in communication with the bottom passage 8 which is in communication with the outer passage 7 adjacent to the outer wall where the concentrated red corpuscles are located. The sealing gasket 15 separates this red corpuscle communication passage network from the lighter fractions located (through central passage 6) in the upper and inner portions of the container. The sealing gasket permits the invention to achieve the proposed end, since suction of the red corpuscles from the cell can occur even if the cell is not completely filled.

In the case of autotransfusion, after even a small amount of blood has been recovered and sent to the cell, it is possible to quickly perform reinfusion of the red corpuscles back to the patient. The suction phase of the red corpuscles can continue until the cell contains substantially only the light components of plasma platelets and white corpuscles.

Although the present invention has been described and illustrated in connection with a certain embodiment, it is to be understood that modifications and variations may be resorted to without departing from the spirit of the invention, as those skilled in the art will readily understand. Such modifications and variations are considered to be within the perview and scope of the present invention as defined by the appended claims.

What is claimed is:

1. A centrifugation cell for blood and biological liquids, comprising:
- an outer container rotatable about a central axis having an outer wall, an upper end and an enclosed bottom;
- a volume displacement body having an upper end, a lower end and a generally cylindrical central longitudinal passage therein, and coaxially enclosed within said container with the lower end closely spaced from the bottom of said container;
- a stationary housing connected to and enclosing the upper end of said container through an annular rotatable seal and consisting of a coaxial first conduit adapted for the initial inflow of blood, a generally coaxial second conduit adapted for the outflow of light blood fraction components and a means providing a stationary passage within said housing near the upper end of said container and in communication with said second conduit;
- said first conduit extending downwardly through the central passage of said body with the end thereof closely spaced from the bottom of said container;
- said body further having a means for substantially sealing the space between said first conduit and the central passage at a location near the lower end of said body for facilitating the outflow of red blood components from said container.

2. The centrifugation cell of claim 1 wherein said sealing means comprises a disc shaped elastomeric gasket having a central aperture adapted to receive said first conduit.

3. A centrifugation cell for blood and biological liquids, comprising:
- an outer container rotatable about a central axis having an outer wall, an upper end and an enclosed bottom;

a volume displacement body having an upper end, a lower end and a generally cylindrical central longitudinal passage therein, and coaxially enclosed within said container with the lower end closely spaced from the bottom of said container;

a stationary housing connected to and enclosing the upper end of said container through an annular rotatable seal and having a coaxial first conduit adapted for the initial inflow of blood and a generally coaxial second conduit adapted for the outflow of light blood fraction components;

a means providing a stationary passage within said housing near the upper end of said container and in communication with said second conduit;

said first conduit extending downwardly through the central passage of said body with the end thereof closely spaced from the bottom of said container;

said body further having a means for substantially sealing the space between said first conduit and the central passage at a location near the lower end of said body for facilitating the outflow of red blood components from said container;

wherein said sealing means comprises a disc shaped elastomeric gasket having a central aperture adapted to receive said first conduit and said gasket is retained within an annular recess in the central passage of said body.

4. The centrifugation cell of claim 1 wherein the central passage of the said body further comprises a reduced diameter portion near the lower end thereof.

5. The centrifugation cell of claim 4 wherein the reduced diameter portion of said body includes the annular recess and said sealing means further comprises an elastomeric disc having a diameter adapted to engage said annular recess.

* * * * *